United States Patent
Gentry et al.

[15] 3,656,474
[45] Apr. 18, 1972

[54] METHOD AND APPARATUS FOR MEDICAL DIAGNOSIS

[72] Inventors: Elwood M. Gentry; Arnys Clifton Lilly, Jr., both of Richmond, Va.

[73] Assignee: Philip Morris Incorporated, New York, N.Y.

[22] Filed: Aug. 22, 1969

[21] Appl. No.: 852,260

[52] U.S. Cl. .................................................. 128/2.1 R
[51] Int. Cl. ................................................... A61 5/00
[58] Field of Search ........... 128/2 R, 2.05 PQ, 2.05 R, 2.05 S, 128/2.05 T, 2.06 B, 2.06 F, 2.06 G, 2.06 R, 2.06 V, 2.1 R

[56] References Cited

UNITED STATES PATENTS

| | | | |
|---|---|---|---|
| 2,712,975 | 7/1955 | Golseth et al. | 128/2.1 R |
| 3,439,358 | 4/1969 | Salmons | 128/2.1 R |
| 1,816,465 | 7/1931 | Boas et al. | 128/2.06 F |
| 2,756,741 | 7/1956 | Campanella | 128/2.05 R |
| 2,848,992 | 8/1958 | Pigeon | 128/2.06 F |
| 3,029,808 | 4/1962 | Kagan | 128/2.06 B |
| 3,181,528 | 5/1965 | Brackin | 128/2 R |

OTHER PUBLICATIONS

Glasser, " Medical Physics" Vol. 3, 1960 pp. 251– 256

*Primary Examiner*—William E. Kamm
*Attorney*—Watson, Leavenworth & Kelton

[57] ABSTRACT

A method for quantitative observation of body functions expressed in muscular activity is disclosed along with apparatus for implementing the method in respect of both active and inactive subjects, particularly for observing coughing. The method involves the derivation and compound differencing of signals indicative of contraction of a common activated muscle, and the counting of compound difference signals. In the case of active subjects, the method provides for suppression of counting of compound difference signals where same are not indicative of the occurrence of the body function under observation.

10 Claims, 2 Drawing Figures

3,656,474

METHOD AND APPARATUS FOR MEDICAL DIAGNOSIS

BACKGROUND OF THE INVENTION

This invention relates to a medical diagnostic technique and more particularly to method and apparatus for the study of body functions expressed through reflex actions culminating in muscular activation.

As part of medical diagnosis, the accurate quantitative monitoring of body functions is particularly helpful in determining the existence or abatement of a body disorder, in evaluating experimental medicines and like instances. For example, in evaluating irritation of the respiratory tract, the accurate counting of coughs, reflex actions initiated in response to such irritation, may provide information regarding the efficiency of medication, or the existence or abatement of various acute infectious diseases among which are the common cold, chronic pulmonary diseases and heart ailments. Heretofore, various techniques have been employed for purposes of monitoring cough periodicity, all of which are audile in nature, i.e., cough periodicity is determined by monitoring an auditory response of the body associated with coughing. Two such prior audile cough detection schemes involve the continuous recording of a subject's coughing over an extended period of time with subsequent manual count, and the use of voice-actuated relays operatively responsive to occurences of the auditory response for automatic counting thereof. In the former arrangement, extensive time is required for analysis of the continuous recording. In the latter scheme, in the absence of highly complex frequency selective circuitry associated with the voice-actuated relay, substantial error may be expected. Furthermore, both of these varieties of audile detection systems are particularly inappropriate where it is desired to monitor the body function of an active, unconfined subject.

SUMMARY OF THE INVENTION

It is an object of the present invention to provide apparatus and method for automatic detection of the occurrence of body functions expressed in muscular activity.

It is a more particular object of this invention to provide medical diagnostic apparatus for accurate quantitative monitoring of coughing.

In the present invention, applicants have devised a method for accurate quantitative observation of body functions having both audile and non-audile associated responses which stem from reflex actions culminating in recordable muscular movements. In particular connection with cough detection and monitoring, applicants have noted that an ascertainable contraction occurs in the middle trapezius muscle during coughing and that this contraction may be readily detected by applying to that muscle a pair of transducers suitably positioned thereon for cognizance of disproportionate activity of the muscle during coughing. A further transducer is applied to the spinal column or other neutral point on the body and, by compound differencing of the transducer output signals, an electrical pulse indication of the occurrence of coughing may be provided. Muscle noise, i.e., electrical signals attributable to electromyographic potentials, is readily eliminated by filtering or integration techniques and the filter output may be counted to indicate the numerical occurrence of the body function over a period of time. Further characteristic of the method and apparatus of the invention is its ready applicability to an active subject since all necessary equipment may be miniaturized. The inefficiency and error likelihood of the above-discussed schemes is minimized since the body function is analyzed apart from its associated audile response.

A further feature of the method and apparatus of the invention is its applicability to the monitoring of body functions which, while expressable in disproportionate contraction of a muscle, are not exclusively expressed by such contraction of said muscle, i.e., the muscle may be activated independently of the body function under evaluation. In the specific example to be discussed in detail hereinafter and alluded to above, cough detection, contraction may of course occur in the middle trapezius muscle independently of coughing by movement of the arms, trunk or head of the subject. In order to suppress cough indication upon such muscle activity not caused by the reflex action accompanying the body function, means are provided in the apparatus of the invention for the exclusive counting of muscular contractions caused by the body function being evaluated.

The above and other objects and features of the invention will be evident from the following detailed description of preferred embodiments of the apparatus of the invention and from the discussion of the method of the invention.

Reference shall be made to the accompanying drawings wherein like numerals relate to like parts throughout.

DESCRIPTION OF THE PREFERRED EMBODIMENTS

Figure 1:
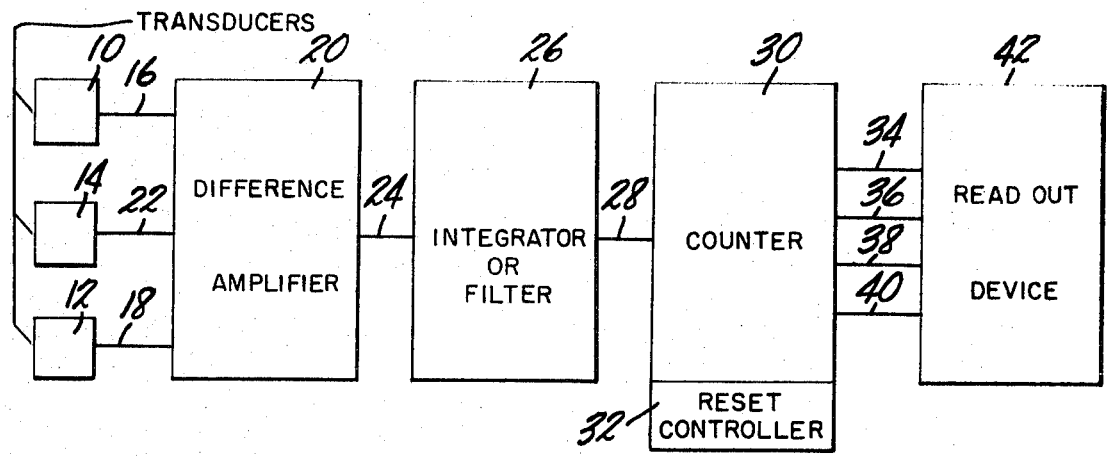
FIG. 1 is a block diagram of apparatus in accordance with the invention applicable primarily to inactive subjects.

In the block diagrammatic illustration of FIG. 1, a cough detection system implementing the method of the invention is illustrated as comprising first and second muscle-associated transducers 10 and 12 and a third transducer 14 associated with a neutral body point such as the spine. The transducers may all comprise commercial body electrodes, such as "Band-Aide" produced by Johnson & Johnson Inc. which provide an electrical potential or signal varying in amplitude in response to the extent of muscle contraction.

Transducers 10 and 12 are applied to the skin of the body juxtaposed with the second or middle trapezius muscle of the back of a subject under evaluation and are connected by lines 16 and 18 to provide first and second input signals to amplifier 20. Transducer 14 is connected by line 22 to the amplifier to provide a ground or neutral reference. Amplifier 20 is preferably a differential amplifier providing a high common-mode rejection of 80 or more in order to eliminate the bothersome 60-cycle signal component normally present in the output signals of body electrodes. At the differencing input of amplifier 20, a first differential signal is derived by comparison of transducer 10 and 14 output signals and a second differential signal is derived by comparison of transducer 12 and 14 output signals. The remaining amplifier circuitry is operative to determine the difference between these two differential signals and to provide an overall amplification of from 300 to 400 for such difference signal. Typically, the difference voltage between the first and second differential signals is approximately 0.010 volts and amplifier 20 provides an output voltage of approximately 3.6 volts in response thereto.

The amplifier output is applied over line 24 to an integrating circuit 26. A primary function of the integrator is to eliminate muscle electrical potentials, i.e., very high frequency signals characteristically associated with muscle movement. In addition, the integrator provides a filtering or smoothing effect whereby the peak variations resulting in the output signal of amplifier 20 in response to a single cough are averaged into a relatively constant amplitude output pulse. Integrator 26 output signals are conducted over line 28 to a counter 30. The counter may be of any suitable type providing for notation of the occurrences of discrete pulse outputs of integrator 26. A preferred form for counter 30 comprises three Texas Instruments Model S.N. 7490 binary decade storage units, each providing a digital count of zero to nine and stepping the next successive binary decade storage unit upon attainment of full count and at the same time automatically resetting itself to zero count. With these three storage units, a count of from zero to 999 can be stored, thus permitting observation of the subject's coughing experience throughout the course of an extended period of time. The counter is provided with a manual reset controller 32 for clearing all storage units to zero count prior to the start of evaluation of each body function.

In deployment of the apparatus described to this point, amplifier 20, integrator 26 and counter 30 and associated power supply are preferably made in sub-miniature form such that they may be readily carried on the person of the subject without undue discomfort to him. A relatively small package may contain all of the units with connectors 16, 18 and 22 extending from this package to the applied body transducers 10, 12 and 14. At the conclusion of a study period, the package is preferably removed from the subject and connected to a permanent indicating unit 42 through separable plug-in connectors 34, 36, 38 and 40 for readout.

In implementing the present method of body function monitoring transducers 10 and 12 of the system of FIG. 1 are applied to the middle trapezius muscle, being spaced apart by a distance of from one-half to three-quarters of an inch and by disproportionate activation of the muscle during contraction thereof, provide output voltages of magnitude proportional to the degree of muscle contraction. Such disproportionate activity of the trapezius muscle may evidently occur in response to various body functions. One function of this type is the coughing reflex action responsive to respiratory tract irritation and resulting in a sudden expulsion of air from the lungs and contracting the trapezius muscle extensively throughout the transducer spacing distance. Applicants have determined that by appropriate gain setting as discussed above for amplifier 20 or by the provision of a suitable threshold level for integrator 26, an electrical pulse suitable for triggering counter 30 may be developed for each such reflex action by compound differencing of the output signals of transducers 10 and 14 and 12 and 14, respectively. On the other hand, minor muscle contractions which fall below the amplitude level required for generation of a cough indicating pulse will not be counted.

Figure 2:
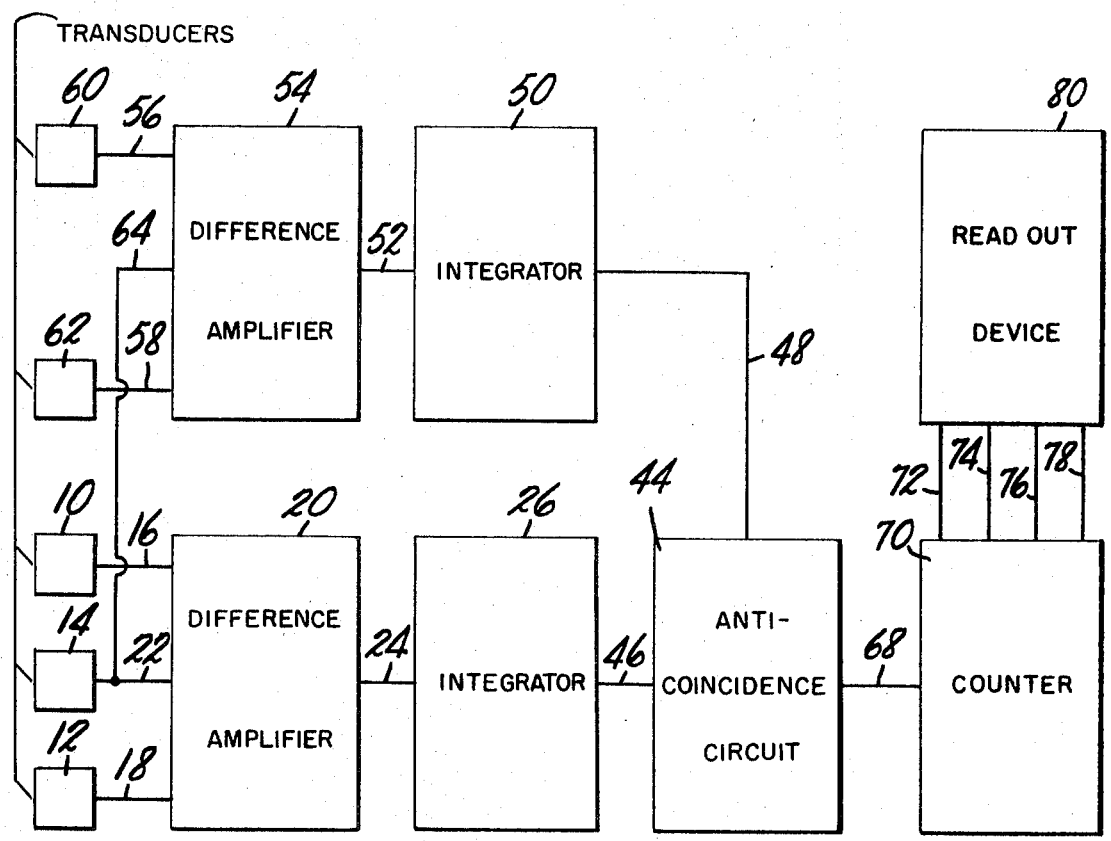
FIG. 2 is a block diagram of apparatus in accordance with the invention applicable to active subjects.

While the system of FIG. 1 is entirely suitable where the subject whose body function is being evaluated is inactive and has proved successful in extensive testing, recourse may be had to the alternate embodiment of the invention illustrated in FIG. 2 where the subject under observation is active and likely to engage in activities which may disproportionately contract or activate the middle trapezius muscle, or other muscle being monitored for reflex action to a degree erroneously indicating the occurrence of a cough. In the system of FIG. 2 additional means are incorporated for inhibiting the counting of a pulse derived due to disproportionate contraction of the middle trapezius muscle when another monitored muscle indicates that the contraction of the trapezius muscle may be due to a cause other than coughing.

In the FIG. 2 system, an anti-coincidence network 44 is connected to the output of integrator 26 by line 46. Also applied to network 44 over line 48 is the output of a second integrator 50. This integrator has the input terminal thereof connected by line 52 to a second differential amplifier 54, whose input is connected by lines 56 and 58 to fourth and fifth transducers 60 and 62, and by line 64 to neutral body point transducer 14.

Transducers 60 and 62 are applied in suitably spaced relation to the skin juxtaposed with a body muscle, activation of which is likely to accompany activation of the muscle under observation by transducers 10 and 12 during non-occurrence of the body function being monitored. Specifically, in the cough detection application of the invention, wherein transducers 10 and 12 are monitoring activity of the middle trapezius muscle, transducers 60 and 62 may be associated with the middle deltoid muscle, the mid-portion of the large triangular muscle covering the shoulder joint and serving to raise or abduct the arm laterally. Assuming transducers 10 and 12 to be positioned on the left side of the back juxtaposed with the trapezius muscle, transducers 56 and 58 are placed in similar association with the middle deltoid muscle covering the left shoulder joint. Evidently, when the left arm is lifted, as in manual labor, the trapezius muscle will undergo contraction. If such arm movement is moderately violent, amplifier 20 will sense an input signal combination equivalent to that which accompanies coughing and will generate a signal for integration by integrator 26 and for counting on line 46.

Concurrently with the generation of the pulse on line 46, there is provided on line 48 a pulse indicative of the fact that the middle deltoid muscle has been activated, said pulse being generated by amplifier 54 in response to the output signals of transducers 60 and 62 and spinal or neutral electrode 14 and smoothed by integrator 50. Network 44 is inclusive of circuitry receiving the signals from lines 46 and 48 and generating a signal on output line 68 only upon the existence of conditions wherein a signal is provided on line 46 and a signal is not concurrently provided on line 48. Typically, network 44 may be a NAND gate providing an output signal on line 68 only when the input signal on line 46 is ON or high and the input signal on line 48 is OFF or low. A counter 70 of the type discussed above in connection with counter 30 is operatively responsive to signals provided on line 68 to provide a count of the actual occurrences of the body function under consideration. Counter 70 provides output signals over lines 72, 74, 76 and 78 to a readout unit 80 which, as in the case of readout unit 32 of FIG. 1, provides a visual indication of cough count stored in counter 70.

In the system of FIG. 2, it will be seen that a pair of independent muscle contraction sensing channels cooperate to selectively indicate the occurrence of one of two body functions, the one body function being exclusively detectable by simple combination of the channel outputs in NAND fashion. Evidently where the muscle under observation is subject to activation by multiple body functions other than the body function being monitored, additional muscle activity sensing channels may be incorporated. For example, if by reason of the occupational engagement or unusual body characteristic of the subject, activation of a muscle other than the middle deltoid muscle is normally accompanied by sufficient contraction of the middle trapezius muscle to be likely to generate an erroneous indication of the occurrence of coughing, additional transducers may be applied to this other muscle and signal combining circuit means 44 may be modified to accommodate multiple NAND inputs inclusive of the input derived from integrator 50 of FIG. 2 and a further integrator operatively associated with a differential amplifier receiving input signals from the additional set of transducers. Evidently a count signal will be provided in such modified system only upon the occurrence of exclusive activation of the middle trapezius muscle. In this connection, it should be noted that the middle trapezius muscle is also activated during retraction and depression of the shoulder girdle and upon upper back extension, trunk movements which occur without arm movement.

While the method and apparatus of the invention has been disclosed with particular reference to the observation of a given body function, that of coughing, it will be evident from this illustration that the invention may be practiced in the evaluation of essentially any body function accompanied by reflex action providing disproportionate activation of a muscle. Furthermore, it will be noted that such observed muscle need not be exclusively actuated to the requisite extent in response to such reflex action but may be stimulated by other body activities not of concern in the observation.

What is claimed is:

1. A method for quantitative determination of the occurrence of coughing comprising the steps of:
   a. measuring with respect to a neutral body point the separate displacements of spaced points of the middle trapezius muscle and generating first and second output signals having amplitudes respectively indicative of said separate displacements;
   b. detecting the amplitude difference between said first and second output signals and generating a third output signal indicative of said amplitude difference;
   c. establishing a threshold level; and
   d. counting instances wherein the amplitude of said third output signals exceeds said threshold level.

2. The method claimed in claim 1 further including the terminal step of providing a visual indication of such count.

3. The method claimed in claim 1 including the further step of filtering said third output signal prior to said counting step to eliminate muscle noise signals therefrom.

4. A method for quantitative determination of the occurrence of a body function comprising the steps of:
 a. measuring with respect to a neutral body point the separate displacements of spaced points of a first muscle subject to contraction by reflex action accompanying occurrence of said body function and generating first and second output signals respectively indicative of said separate displacements;
 b. detecting the difference between said first and second output signals and generating a third output signal indicative of said difference;
 c. measuring with respect to a neutral body point the separate displacements of spaced points of a second muscle not subject to contraction by said reflex action accompanying occurrence of said body function and generating fourth and fifth output signals respectively indicative of said separate displacements, contraction of said second muscle also producing contraction of said first muscle during a body function other than said body function accompanying said reflex action;
 d. detecting the difference between said fourth and fifth output signals and generating a sixth output signal indicative of said difference;
 e. establishing a threshold level; and
 f. counting instances wherein the amplitude of said third output signal exceeds said threshold level and at the same time the amplitude of said sixth output signal does not exceed said threshold level.

5. The method claimed in claim 4 further including the terminal step of providing a visual indication of said count.

6. The method claimed in claim 4 including the further step of filtering said third and sixth output signals prior to said counting step to eliminate muscle noise signals therefrom.

7. The method claimed in claim 4 wherein said body function accompanying said reflex action is coughing, wherein said first muscle is the middle trapezius muscle and wherein said second muscle is the middle deltoid muscle.

8. Apparatus for quantitative determination of the occurrence of a body function comprising:
 a. first and second transducers for contacting the skin juxtaposed with spaced points of a first muscle subject to contraction by reflex action accompanying occurrence of said body function;
 b. a third transducer contacting the skin juxtaposed with a neutral body point;
 c. first circuit means detecting a first voltage differential between the output signals of said first and third transducers, detecting a second voltage differential between the output signals of said second and third transducers and generating an output signal indicative of the voltage difference between said first and second voltage differentials;
 d. fourth and fifth transducers contacting the skin juxtaposed with spaced points of a second muscle not subject to contraction by said reflex action initiating occurrence of said body function, contraction of said second muscle also producing contraction of said first muscle during a body function other than said body function initiated by said reflex action;
 e. second circuit means detecting a third voltage differential between the output signals of said third and fourth transducers, detecting a fourth voltage differential between the output signals of said third and fifth transducers and generating an output signal indicative of the voltage difference between said third and fourth voltage differentials;
 f. signal combining means receiving said first and second circuit means output signals and generating an output signal when said first circuit means output signal has an amplitude exceeding a predetermined magnitude and said second circuit means output signal has an amplitude below said predetermined magnitude; and
 g. counting means operative to detect and record said signal combining means output signals.

9. The apparatus claimed in claim 8 further including readout means providing a visual indication of the count stored in said counting means.

10. The apparatus claimed in claim 8 further including filtering means eliminating muscle noise signals from said first and second circuit means output signals.

* * * * *